United States Patent [19]
Moriya et al.

[11] Patent Number: 4,562,562
[45] Date of Patent: Dec. 31, 1985

[54] TRACKING SYSTEM FOR CONTROLLING THE RADIAL POSITIONING OF A TRANSDUCER ON A DISC MEDIUM

[75] Inventors: Mitsuro Moriya; Toshiji Kanamaru, both of Osaka; Yoshinobu Nakata, Nara, all of Japan

[73] Assignee: Matsushita Electric Industrial Co., Ltd., Osaka, Japan

[21] Appl. No.: 478,443

[22] Filed: Mar. 24, 1983

[30] Foreign Application Priority Data

Mar. 26, 1982 [JP] Japan .................................. 57-49556

[51] Int. Cl.[4] ........................ G11B 7/00; G11B 21/08; G11B 21/10
[52] U.S. Cl. ........................................ 369/32; 369/33; 369/41; 369/44; 369/46; 360/77; 360/78; 318/593; 318/617
[58] Field of Search ...................... 360/77, 78; 369/32, 369/33, 41, 43, 44, 46; 358/342; 318/592, 593, 616–618, 561

[56] References Cited

U.S. PATENT DOCUMENTS 3,924,268 12/1975 McIntosh et al. .................. 360/78
4,106,058 8/1978 Romeas et al. ................... 360/78
4,236,232 11/1980 Jansen et al. ..................... 369/33
4,310,914 12/1982 Riddle .............................. 369/43

FOREIGN PATENT DOCUMENTS 56-93144 7/1981 Japan .................................. 360/78
56-153557 11/1981 Japan .................................. 369/33

Primary Examiner—Raymond F. Cardillo, Jr.
Assistant Examiner—Steven R. Garland
Attorney, Agent, or Firm—Burgess, Ryan & Wayne

[57] ABSTRACT

A data track searching device capable of switching between two modes; one being the rough searching mode in which a transducer is displaced at a high velocity to a desired track and the other being the fine searching mode which follows the rough searching mode and in which the transducer is displaced at a relative low velocity and positioned over the proper or desired track. The operating point of a tracking element is shifted or deviated as a result of the high-velocity displacement of the transducer in the rough searching mode so that stable searching cannot be ensured. According to the present invention, therefore, the acceleration of the transducer in the rough searching mode is detected and a signal representative of the thus detected acceleration is applied to the tracking element so that the shift or deviation of the operating point of the tracking element can substantially made nil.

8 Claims, 19 Drawing Figures

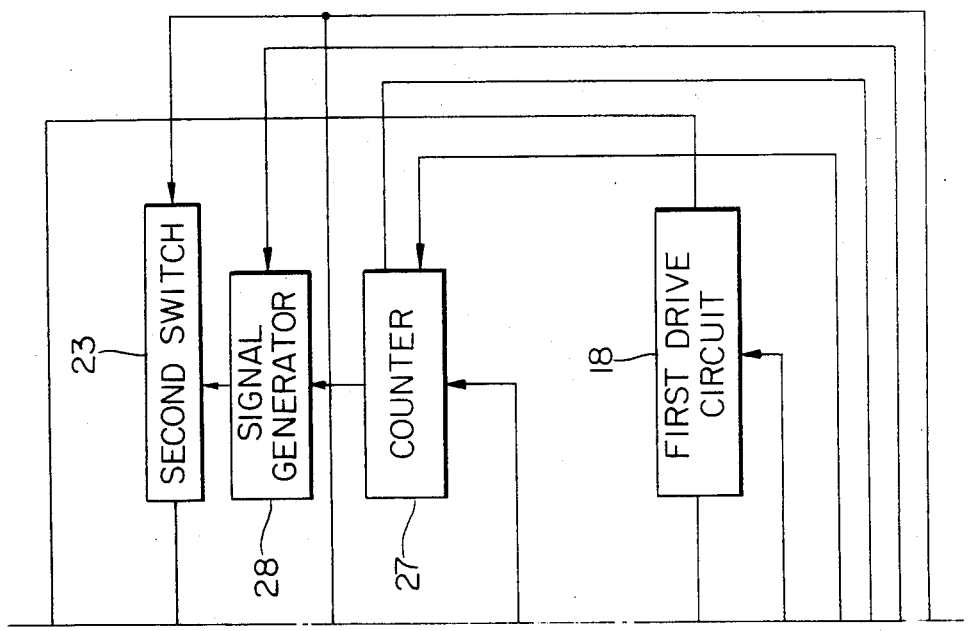

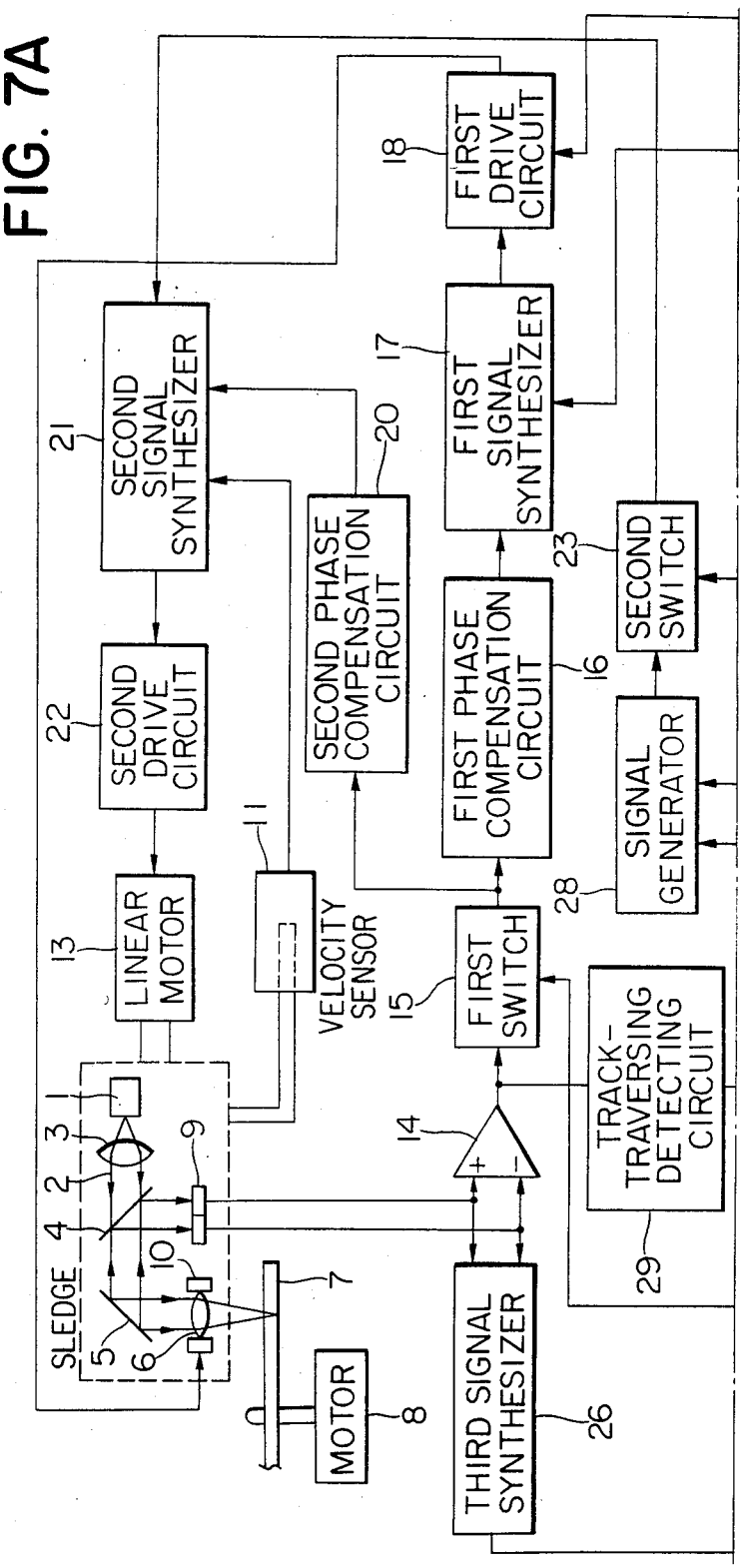

TRACKING SYSTEM FOR CONTROLLING THE RADIAL POSITIONING OF A TRANSDUCER ON A DISC MEDIUM

BACKGROUND OF THE INVENTION

The present invention relates to a recording and/or reproducing device capable of accessing a desired data track on an information medium; and more particularly an improvement of a device capable of switching between two searching modes, one being the rough searching mode in which recording and/or reproducing transducer means can be displaced at a high velocity to the vicinity of a desired data track and the other being the fine searching mode which follows the rough searching mode and in which the transducer means is displaced at a relatively slow velocity so as to be correctly positioned on the desired data track.

The recording and/or reproducing device of the type described comprises in combination transducer means for writing and/or reading data onto or out of one of a plurality of data tracks on an information medium, first driving means for displacing the transducer means in the direction substantially perpendicular to the direction of the tracks on the information medium for searching a desired data track, a second driving means for displacing both the transducer means and the first driving means in the direction substantially perpendicular to the direction of the tracks on the information medium for effecting the rough searching, and tracking control means for controlling the first driving means in such a way that scanning means of the transducer means may be always positioned on the proper track.

Each of the data tracks on the information medium is labeled with a specific address and searching for a desired data track is based upon such addresses. In the case of the searching, first, the tracking control means is rendered inoperative and the second driving means is energized to displace the transducer means to the vicinity of a desired data track. Thereafter the transducer means is displaced in the fine searching mode by the first driving means. Thus, the transducer means traverses the tracks until it can finally access a desired data track.

In the data track searching device of the type described, when the transducer means is displaced at a high velocity in the rough searching mode by the second driving means, the first driving means is shifted or deviated due to inertia. As a result, when the transducer means is brought to the vicinity of a desired data track and the tracking control means is enabled, unstable draw-in of the control system occurs so that it takes an undesirably long time before the control system is completely stabilized. Furthermore, it happens very often that when the tracking control means is enabled, the transducer means is not drawn in the track on which the transducer means is positioned but is drawn into a track spaced away from the former. As a result, the search time becomes longer.

There has been also devised and demonstrated a method in which the displacement of the transducer means is detected by detecting the number of tracks which the transducer has traversed, whereby the position of the transducer means is determined. However, in this case, if the first driving means is shifted or deviated, a normal signal is not applied to the transducer means so that the position of the transducer means cannot be accurately determined. As a result, the search time also becomes longer.

SUMMARY OF THE INVENTION

The primary object of the present invention is to provide a device which is so designed and constructed that even when the second driving means is displaced at a high velocity, the shift or deviation of the first driving means is substantially eliminated or minimized, whereby a desired data track can be accessed at a high speed in a stabilized manner.

To the above and other ends, according to the present invention, acceleration signal generating means is provided which is adapted to generate a signal substantially corresponding to the displacement acceleration of the second driving means and the signal is applied to the first driving means when the second driving means is displaced while the tracking control means is rendered inoperative, whereby the shift or deviation of the first driving means as a result of the displacement of the second driving means can be minimized.

The above and other objects, effects and features of the present invention will become more apparent from the following description of preferred embodiments thereof taken in conjunction with the accompanying drawings.

BRIEF DESCRIPTION OF THE DRAWINGS

FIGS. 7, 7A and 7B constitute a block diagram of a second embodiment of the present invention in which the direction of the displacement acceleration is detected in response to the displacement of the sledge and a signal corresponding to the thus detected direction of the displacement acceleration is applied to the tracking element, thereby preventing the shift or deviation of the element.

Same reference numerals are used to designate similar parts throughout the figures.

DESCRIPTION OF THE PREFERRED EMBODIMENTS

First Embodiment, FIGS. 1 through 6

Figure 1A:
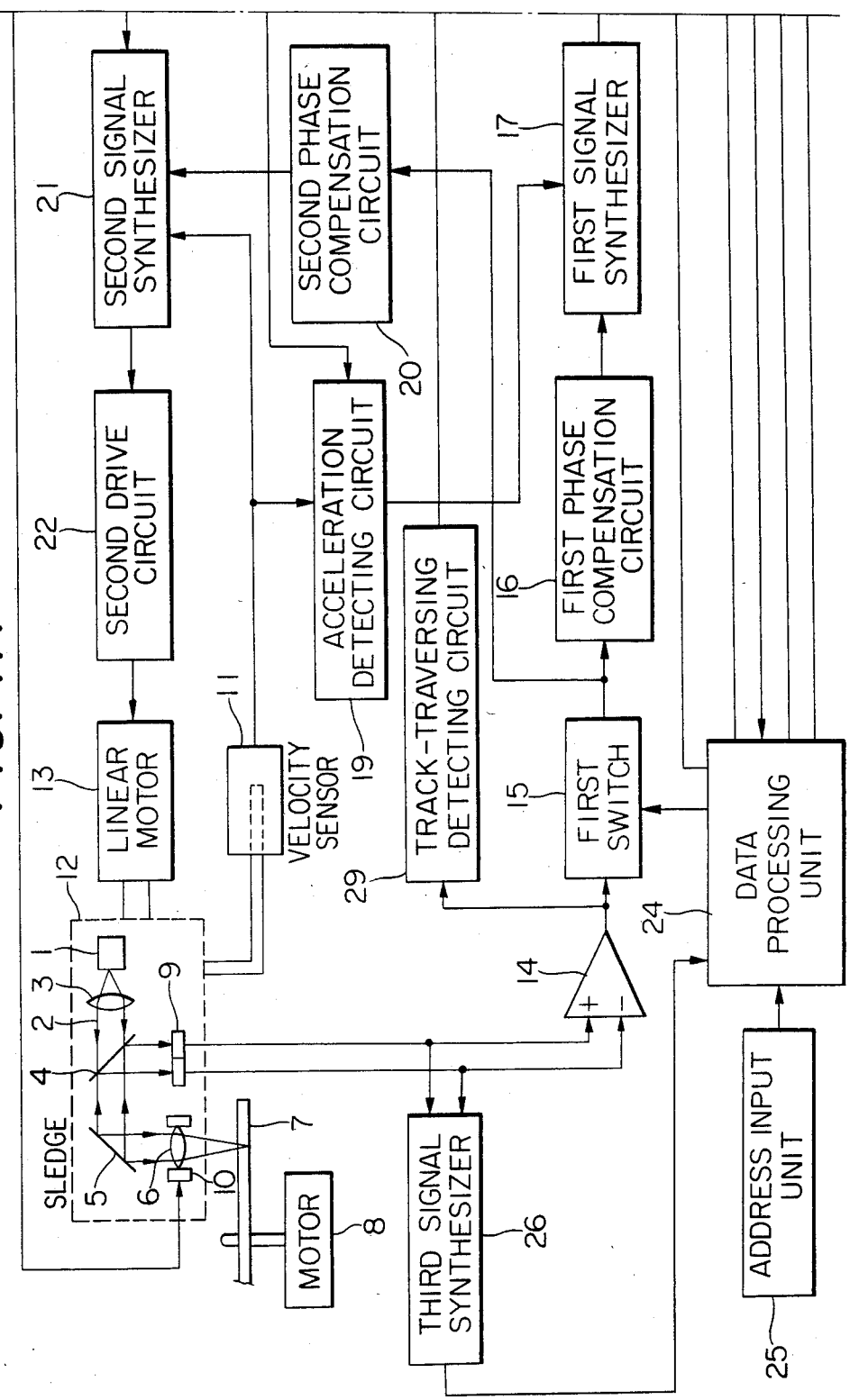
FIG. 1 is a block diagram of a first embodiment of the present invention.
Figure 2:
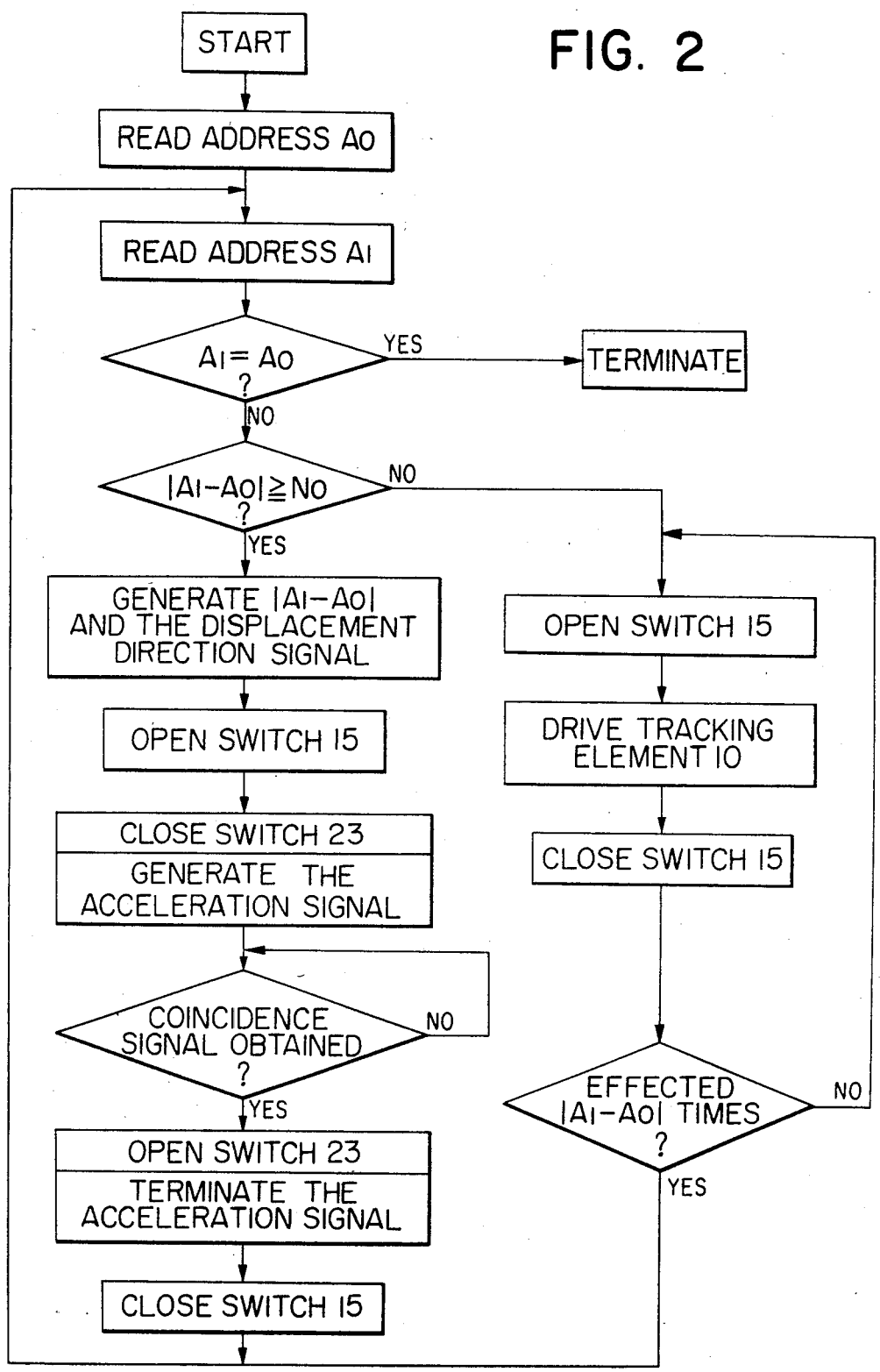
FIG. 2 is a flowchart used to explain the mode of operation of a data processing unit thereof.

In FIG. 1 is shown a block diagram of a first embodiment of the present invention; that is, an optical recording and reproducing system.

A beam of light 2 emitted from a light source 1 passes through a coupling lens 3 and a beam splitter 4, is reflected by a reflecting mirror 5 and is converged through a converging lens 6 on a disk-shaped recording medium 7. The disk-shaped recording medium 7 is carried on a rotary shaft of a motor 8 and is rotated at a predetermined rotational speed. The disk-shaped recording medium 7 comprises a substrate, a plurality of pregrooved concentric tracks or a pregrooved spiral track formed thereon, a recording material or layer and a protective film or layer coated or otherwise formed over the concentric tracks or the spiral track in the order named. The successive tracks (coils in the case of a spiral track) are given respective addresses from the radially innermost one to the radially outermost one.

The beam of light 2 reflected from the disk-shaped recording medium 7 passes through the converging lens 6, is reflected by the reflecting mirror 5 and the beam splitter 4 and falls on a two-split photosensor 9.

The converging lens 6 is mounted on a tracking element 10 which is adapted to traverse radially the disk-shaped recording medium 7; that is, to move in the direction substantially perpendicular to the tracks on it.

The light source 1, the coupling lens 3, the beam splitter 4, the reflecting mirror 5, the photosensor 9, the tracking element 10 and a velocity sensor 11 are mounted on a sledge 12 which in turn is driven by a linear motor 13 so as to traverse radially the disk-shaped recording medium 7.

The velocity sensor 11 comprises a movable member comprising a bar-shaped magnet and a stationary member comprising a coil; the movable member being securely mounted on the sledge 12. The velocity sensor 11 generates a signal representative of the velocity of the sledge 12.

Next, the tracking control system for maintaining the beam of light 2 to locate always the track on the disk-shaped recording medium 7 will be described. Two output signals are derived from the photosensor 9 and applied to a differential amplifier 14 which is adapted to produce an output signal representative of the difference between the two input signals. The photosensor 9 is divided in the direction parallel with the direction of the tracks imaged on the photosensor 9. The output signal from the differential amplifier 14 represents the relationship between the beam of light 2 located on the disk-shaped recording medium 7 and a track thereon; that is, it is a tracking error signal. The construction and mode of operation of such photosensor 9 and differential amplifier 14 are well known in the art so that no further description shall be made in this specification.

The output signal from the differential amplifier 14 is transmitted to the tracking element 10 through a first switch 15, a first phase compensation circuit 16 for compensating the phase of the tracking control loop, a first signal synthesizer 17 and a first drive circuit 18 for driving the tracking element 10.

As will be described in detail below, the signal synthesizer 17 is adapted to synthesize the output signal from the phase compensation circuit 16 with the output signal from an acceleration detecting circuit 19. When the tracking control is being effected, the acceleration detecting circuit 19 will not generate its output signal. It follows, therefore, that in response to the output signal from the differential amplifier 14, the tracking element 10 displaces the converging lens 6 in such a way that the beam of light 2 may be located on a desired track on the disk-shaped recording medium 7.

The range of the displacement of the tracking element 10 is of the order of 500 micrometers ($\mu$m). If the sledge 12 moves a relatively long distance, the beam of light 2 is deviated from a desired track. Therefore, the linear motor 13 is driven in such a way that the average output signal from the drive circuit 18 may become zero and subsequently the displacement of the sledge 12 is so controlled that the tracking element 10 may be generally positioned at the center of its displacement range. More particularly, the output signal from the differential amplifier 14, which is derived through the first switch 15, is applied to the linear motor 13 through a second phase compensation circuit 20 for compensating the phase of a displacement control loop, a second signal synthesizer 21 and a second drive circuit 22 for driving the linear motor 13. Therefore, the sledge 12 is displaced in such a way that the tracking element 10 may be displaced about the center of its tracking range. The first switch 15 is inserted in order to disable both the tracking and displacement controls.

The second signal synthesizer 21 is adapted to synthesize the output signal from the second phase compensation circuit 20, the output signal from the velocity sensor 11 and the output signal from a second switch 23 to be described below. The second switch 23 is kept opened when the tracking control is being effected. The output signal from the velocity sensor 11 is applied to the linear motor 13 in order to stabilize the displacement control thereof.

Next, the mode of writing or reading bits along a track on the disk-shaped recording medium 7 will be described. Under the control of the tracking beam control and the sledge displacement control, the intensity of the beam of light 2 which is emitted from the light source 1 is varied in response to the data to be recorded. When the high-intensity beam 2 falls on the disk-shaped recording medium 7, the property of the recording material is changed by absorption of the beam, whereby a signal is recorded along a track on the disk-shaped recording medium 7. In the readout or reproduction mode, the beam of light 2, which is emitted from the light source 1, is reduced in intensity and maintained at a predetermined low level. The light reflected from the disk-shaped recording medium 7 falls on the photosensor 9 in the manner described above.

The optical recording and reproducing system of the type described further includes a focus control system for maintaining the diameter of the light beam 2 constant, but such focus control system does not constitute the present invention so that no description thereof shall be made in this specification.

So far, the fundamental construction of the optical recording and reproducing system to which is applied the present invention has been described. Next, one of the most important features of the present invention; that is, the capability of searching a desired track at a high speed in a stable manner will be described.

A system for searching a desired track in accordance with the present invention includes a data processing unit 24 which in turn includes a microcomputer (not shown). Now assume that the address $A_o$ of a desired track is entered into an address input unit 25. Then in response to the output signal from a third signal synthesizer 26 which is adapted to process the two output signals from the photosensor 9, the data processing unit 24 computes $(A_1-A_o)$, where $A_1$ is the address of the track at which the beam of light 2 is being located. If $|A_1-A_o| \geq N_o$ (where $|A_1-A_o|$ is the absolute value of $(A_1-A_o)$ and $N_o$ is a positive integer), the data processing unit 24 presets $|A_1-A_o|$ into a counter 27 and applies a displacement direction signal to a signal generator 28. The displacement direction signal is a command signal in response to which the sledge 12 is caused to traverse the disk-shaped recording medium 7 radially inwardly or outwardly. Thereafter the data processing unit 24 causes the switch 15 to open so as to disable both the tracking control and the sledge displacement control. Simultaneously, it causes the second switch 23 to close and applies a signal to the acceleration detecting circuit 19 so that the output signal from the signal generator 28 is transmitted to the second signal synthesizer 21 and the output of the velocity sensor 11 is applied to the acceleration detecting circuit 19. The signal generator 28 generates an output signal in response to the output signal from the counter 27 and the displacement direction signal sent from the data processing unit 24 and in response to the output signal from the signal generator 28 the linear motor 13 causes the sledge 12 to move toward a desired track. The output signal from the acceleration detecting circuit 19 is also transmitted to the tracking element 10 so that the element 10 may be held stationary.

The output signal from the differential amplifier 14 is also applied to a track-traversing detecting circuit 29 for detecting whether the beam of light 2 crosses the tracks and generating the output signal or pulse each time when the beam of light 2 crosses one track. The counter 27 counts the output pulses delivered from the track-traversing detecting circuit 29 and generates the coincidence signal when it has counted the output pulses equal to $|A_1 - A_o|$, and applies it to the data processing unit 24. Then the data processing unit 24 sends signal to the second switch 23 and the acceleration detecting circuit 19. The switch 23 is then opened so that the linear motor 13 is stopped and the transmission of the acceleration signal from the sledge 12 to the tracking element 10 is interrupted. The data processing unit 24 also applies a signal to the first switch 15 so that the switch 15 is closed, whereby the tracking control and the sledge displacement control may be resumed. As a result, the address $A_1$ of the track on which the light beam 2 is located is read out. The above-described process for searching the desired track $A_1$ is referred to as "the rough searching" in this specification. If $A_o = A_1$, the rough searching is terminated.

However, if $|A_1 - A_o| \geq N_o$, the rough searching is still carried on. If $|A_1 - A_o| < N_o$, the data processing unit 24 causes the first switch 15 to open and simultaneously applies a signal to the drive circuit 18 so that the tracking element 10 is driven, and at the same time causes the first switch 15 to close so as to cause the beam of light 2 to scan or jump one track (which will be referred to as "the jumping" in this specification). The jumping is repeated $|A_1 - A_o|$ times and the address of the track on which the beam of light 2 is located is read out. The above-described process will be referred to as "the fine searching" in this specification. If $A_o = A_1$, the searching is terminated, but if $A_o \neq A_1$ (that is, if $A_o$ is not equal to $A_1$), the above-described rough and fine searching are repeated until the desired track is reached. The steps carried out by the data processing unit 24 in the cases of the rough and fine searching are shown in flowchart in FIG. 2.

Figure 3:
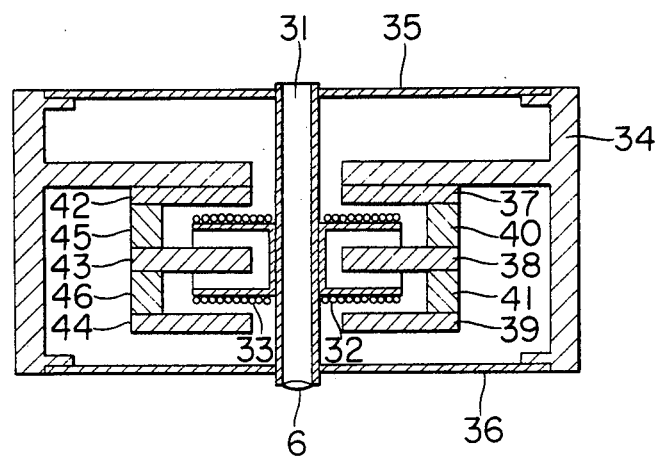
FIG. 3 is a view used to explain the construction of a tracking element.

In FIG. 3 is shown in cross section the tracking element 10. The converging lens 6 is mounted at the lower end of a cylindrical member 31 which also carries a first coil 32 and a second coil 33. The cylindrical member 31 and a chassis 34 are interconnected to each other with rubber members 35 and 36, and the chassis 34 carries yokes 37 and 42 which establish a magnetic circuit. A magnet 40 is interposed between the yokes 37 and 38; a magnet 41, between the yokes 38 and 39; a magnet 45, between the yokes 42 and 43; and a magnet 46, between the yokes 43 and 44, whereby a magnetic circuit is established. When currents pass through the coils 32 and 33, the cylindrical member 31 is displaced under the electromagnetic forces exerted to the coils 32 and 33. The beam of light 2 passes through the cylindrical member 31 and since the converging lens 6 is displaced in unison with the cylindrical member 31, the beam of light 2 which is located on the disk-shaped recording medium 7 is caused to shift in the direction substantially perpendicular to the direction of a track.

The displacement or deviation of the tracking element 10; that is, the displacement of the cylindrical member 31 with respect to the chassis 34 is caused by the force of inertia produced when the sledge 12 is displaced. Therefore, the acceleration of the sledge 12 is detected and applied to the tracking element 10 through the first signal synthesizer 17 and the first drive circuit 18 so that the force of inertia exerted to the tracking element 10 may be cancelled. Then the displacement or deviation of the tracking element 10 can be minimized.

Figure 4:
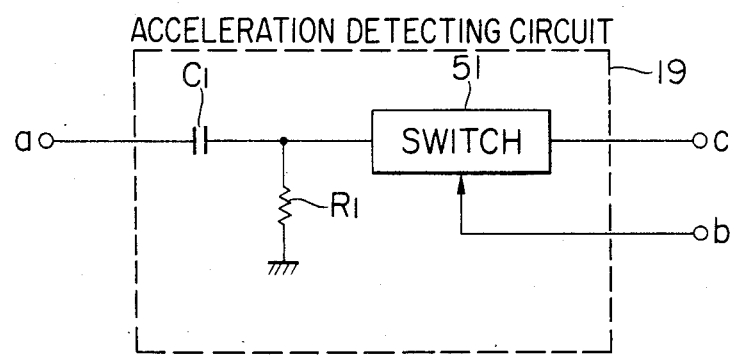
FIG. 4 is a view used to explain the construction of an acceleration detecting circuit.

In FIG. 4 is shown the acceleration detecting circuit 19 comprising a capacitor $C_1$ and a resistor $R_1$. The displacement acceleration of the sledge 12 can be approximated from the voltage across the resistor $R_1$. Referring again to FIG. 1, the output signal from the velocity sensor 11 is applied to the input terminal a; that is, one terminal of the capacitor $C_1$ and a signal from the data processing unit 24 is applied to another input terminal b so as to actuate a switch 51. The output signal derived from the output terminal c; that is, the output from the switch 51 is applied to the first signal synthesizer 17. The other terminal of the capacitor $C_1$, one terminal of the resistor $R_1$ and the input of the switch 51 are interconnected. The other terminal of the resistor $R_1$ is grounded or maintained at the zero level.

The voltage $V_{in}(t)$ at the input a and the current $i_{R1}(t)$ flowing through the capacitor $C_1$ and the resistor $R_1$ have the following relation:

$$V_{in}(t) = \frac{1}{C_1} \int i_{R1}(t)\,dt + R_1 \cdot i_{R1}(t)$$

where t is the time;

$C_1$ is the capacitance of the capacitor $C_1$; and $R_1$ is the resistance of the resistor $R_1$. The Laplace transform of the above equation is $$V_{in}(s) = \frac{1}{C_1 s} I_{R1}(s) + R_1 \cdot I_{R1}(s)$$

where s is the transform variable. Rewriting this equation, we have $$sV_{in}(s) = R_1(1/R_1C_1 + s)I_{R1}(s) \quad (1)$$

This equation holds when the initial values $V_{in}(t=0)=0$ and $i_{R1}(t=0)=0$. If $1/R_1C_1$ is sufficiently greater than an angular frequency $\omega_o$, Eq. (1) may be rewritten in the form of $$sV_{in}(s) = 1/C_1 \cdot I_{R1}(s) \quad (2)$$

within the angular frequency range less than $\omega_o$. The inverse transformation of $sV_{in}(s)$ is $$d/dt(V_{in}(t)) \quad (3)$$

Eq. (3) shows the derivative of $V_{in}(t)$ with respect to t. It follows, therefore, that within an angular frequency range less than $\omega_o$, $$\frac{d}{dt}(V_{in}(t)) = \frac{1}{C_1} i_{R1}(t)$$

$V_{in}(t)$ is the output signal from the velocity sensor 11 and is, therefore, in proportion to the displacement velocity of the sledge 12. Therefore, $d/dt(V_{in}(t))$ represents the signal in proportion to the displacement acceleration of the sledge 12. The voltage across the resistor $R_1$ is $R_1 i_{R1}(t)$ so that within an angular frequency range less than $\omega_o$, it is proportional to the displacement acceleration of the sledge 12.

The reason why the detection of the displacement acceleration of the sledge 12 may be limited within an angular frequency range less than $\omega_o$ will be described below.

The transfer function $G_1(s)$ of the tracking element 10; that is, the ratio $X_1(s)/I_1(s)$, where $X_1(s)$ is the shift of the beam of light 2 on the disk-shaped recording medium 7 and $I_1(s)$ is the signal applied to the tracking element, is given by $$G_1(s) = X_1(s)/I_1(s) = \frac{K_1 \omega_n^2}{S^2 + 2\xi\omega_n S + \omega_n^2} \quad (4)$$

where S is the transform variable, $K_1$ is the sensitivity of the tracking element; that is, a coefficient representative of the shift of the beam of light 2 on the disk-shaped recording medium 7 as a result of per unit input signal, $\xi$ is the damping coefficient of the tracking element 10, and $\omega_n$ is the natural angular frequency of the tracking element 10.

The transfer function $G_1(s)$ has the frequency characteristic that if the amplitude of the input signal is maintained constant, the shift of the beam of light 2 over the disk-shaped recording medium 7 is damped at the rate of 40 dB/decade within an angular frequency range greater than $\omega_n$ when the frequency is varied. For instance, if the amplitude of the input signal is maintained constant, the shift of the beam of light 2 at the angular frequency 100 $\omega_n$ is approximately 1/100 times as high as at the angular frequency 10 $\omega_n$.

The transfer function $G_2(s)$; that is, the ratio $X_2(s)/F_2(s)$, where $F_2(s)$ is the force exerted to the tracking element 10 as a result of the displacement of the sledge 12 and $X_2(s)$ is the displacement of the tracking element 10 as a result of the force $F_2(s)$ exerted thereto, is $$G_2(s) = X_2(s)/F_2(s) = \frac{K_2 \omega_n^2}{S^2 + 2\xi\omega_n S + \omega_n^2} \quad (5)$$

where $K_2$ is a constant; that is, the displacement of the tracking element 10 in response to per unit force. The transfer function $G_2(s)$ has the frequency characteristic similar to that of the transfer function $G_1(s)$. That is, if the force exerted to the tracking element 10 is maintained constant, the displacement or shift of the tracking element; that is, the shift of the cylindrical member 31 with respect to the chassis 34 is damped at the rate of 40 dB/decade within an angular frequency range higher than $\omega_n$.

It follows, therefore, that the force exerted to the tracking element 10 as a result of the displacement of the sledge 12 is in proportion to the displacement acceleration of the sledge 12, but the displacement acceleration with an angular frequency component higher than $\omega_o$ of the sledge 12 almost will not cause the shift of the tracking element 10. Moreover, even when the displacement acceleration signal has some errors in an angular frequency range higher than $\omega_o$ and is applied to the tracking element 10, the latter almost will not displace itself. Thus, the angular frequency $\omega_o$ must be so selected that the shift or deviation of the tracking element 10 may become negligible.

As described above, the displacement acceleration of the sledge 12, which is detected in order to prevent the shift or deviation of the tracking element 10, may be detected within a predetermined angular frequency range less than $\omega_o$. Therefore, the values of the capacitor $C_1$ and the resistor $R_1$ are so selected that the value of $1/R_1 C_1$ is sufficiently greater than $\omega_o$.

The switch 51 is provided for the purpose of transmitting the signal representative of the displacement acceleration of the sledge 12 to the first signal synthesizer 17 only during the time when the linear motor 13 is driven. However, when the tracking control and the sledge displacement control are carried on, the switch 51 is kept opened so that both the controls will not be adversely affected.

The displacement velocity of the sledge 12 can be detected in response to the output signal from the track-traversing detecting circuit 29. The displacement acceleration signal of the sledge 12 can be also detected as will be described below.

Figure 5:
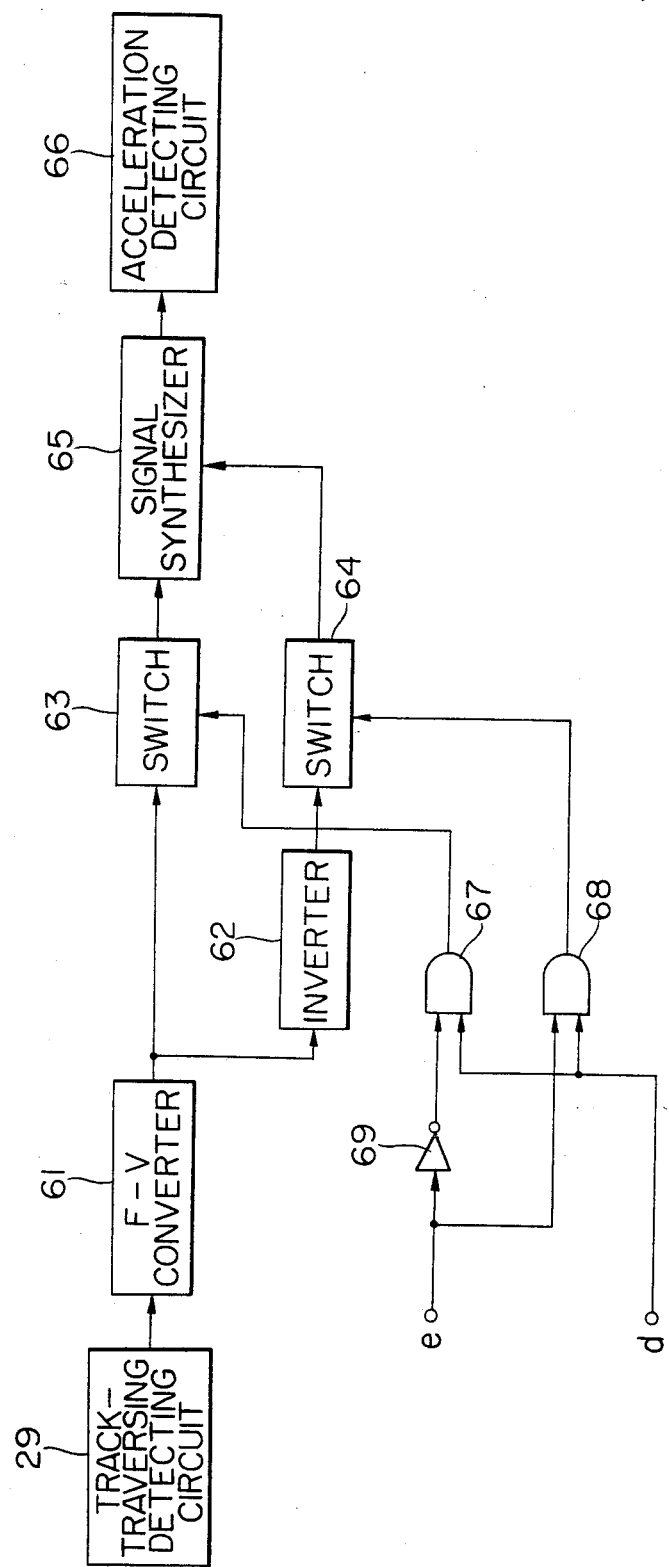
FIG. 5 is a block diagram of a circuitry for detecting the displacement velocity of a sledge in response to the signal obtained from a track-traversing detecting circuit.

Referring to FIG. 5, in the case of the "rough searching", the input terminal d receives the signal for driving the linear motor 13; that is, the signal delivered from the data processing unit 24 (See FIG. 1) to the acceleration detecting circuit 19 and the second switch 23. The input terminal e receives the signal which is delivered from the data processing unit 24 (See FIG. 1) to the signal generator 28. The output signal from the track-traversing detecting circuit 29 is applied to an F-V converter 61 which converts the frequency into a voltage. The output signal from the F-V converter 61 is applied to an inverter 62 which inverts the polarity of the signal received and to a switch 63. The output signal from the inverter 62 is applied to a switch 64. The output signals from the switches 63 and 64 are applied to a signal synthesizer 65 the output of which is applied in turn to an acceleration detecting circuit 66. The signal applied to the input terminal d is applied to one input terminals, respectively, of AND gates 67 and 68 and the signal applied to the input terminal e is applied to an inverter 69 and to the other input terminal of the AND gate 68. The output signal from the inverter 69 is applied to the other input terminal of the AND gate 67. The output signal from the AND gate 67 is applied to the input terminal of the switch 63 for actuating the same while the output signal from the AND gate 68 is applied to the input terminal of the switch 64 for actuating the same.

When the linear motor 13 is driven in the case of the "rough searching", the track-traversing detecting circuit 29 delivers to the F-V converter 61 the signal representative of the number of tracks on the disk-shaped recording medium 7 which the beam of light 2 has crossed or traversed. The F-V converter 61 in turn converts the received or input signal into a voltage signal representative of the frequency of the input signal. That is, the F-V converter 61 delivers the signal representative of the velocity of the beam of light 2 which crosses or traverses the tracks on the disk-shaped recording medium 7. The sledge displacement velocity signal must have one polarity when the sledge 12 is traversing the disk-shaped recording medium 7 radially outwardly, but it has to have the other polarity when the sledge 12 is traversing the disk-shaped recording medium 7 radially inwardly. Therefore, the inverter 62, the switches 63 and 64 and the signal synthesizer 65 are provided. When the high-level signals are applied to both the input terminals d and e, the AND gate 68 is driven into the high state while the AND gate 67, into the low state. As a result, the switch 64 is closed while the switch 63 is opened. Consequently, the output signal from the F-V converter 61 is inverted by the inverter 62 and transmitted to the signal synthesizer 65 through the closed switch 64.

When a high-level signal is applied to the input terminal d while a low-level signal is applied to the input terminal e, the switch 63 is closed while the switch 64 is opened. Therefore, the output signal from the F-V converter 61 is transmitted through the closed switch 63 to the signal synthesizer 65. The signal synthesizer 65 combines the output signals from the switches 63 and 64 and delivers it to the acceleration detecting circuit 66. Since the switches 63 and 64 are not simultaneously closed, the signal synthesizer 65 delivers the output signal with one polarity from the F-V converter 61 or the output signal with the other polarity (inverted by the inverter 62) depending upon the signal applied to the input terminal e when the high-level signal is applied to the input terminal d.

In the case of the "rough searching", the output signal from the signal synthesizer 65 is substantially similar to the output signal delivered from the velocity sensor 11 when the linear motor 13 is being driven. Therefore, in response to the output signal from the signal synthesizer 65, the acceleration detecting circuit 66 can detect the displacement acceleration of the sledge 12. When the tracking control and the sledge displacement control are carried on, the F-V converter 61 delivers no output signal, but sometimes it delivers an output signal in response to noise. Therefore, it is so designed and constructed that only when the linear motor 13 is being driven in the case of the "rough searching mode", the output signal from the F-V converter 61 may be delivered to the signal synthesizer 65.

When the circuit arrangement as shown in FIG. 5 is used, the velocity sensor 11 as shown in FIG. 1 can be eliminated so that the mass of the sledge 12 may be reduced. That is, instead of the velocity sensor 11 and the acceleration detecting circuit 19 as shown in FIG. 1, the circuitry as shown in FIG. 5 is used. Therefore, instead of the output signal from the velocity sensor 11, the output signal of the signal synthesizer 65 is applied to the signal synthesizer 21. In like manner, instead of the output signal from the acceleration detecting circuit 19, the output signal from the acceleration detecting circuit 66 is applied to the signal synthesizer 17. The same signal which is applied to the switch 23 from the data processing unit 24 is also applied to the input terminal d. The same signal which is applied to the signal generator 28 from the data processing unit 24 is also applied to the input terminal e.

The displacement velocity of the sledge 12 can be detected in response to the signal applied to the linear motor 13. If friction is negligible, the following relationship can be established:

$$F_L = K_L \cdot i_L(t) = M \cdot \alpha$$

where
 $F_L$ is the thrust of the linear motor 13;
 $K_L$ is the thrust coefficient thereof;
 $i_L(t)$ is the driving current thereof;
 M is the mass of the sledge; and
 $\alpha$ is the acceleration thereof.

The acceleration $\alpha$ of the sledge 12 is almost proportional to the driving current $i_L(t)$ so that the displacement acceleration of the sledge 12 can be detected from the driving current $i_L(t)$.

It follows, therefore, that the signal which is representative of the current flowing through the coil of the linear motor 13 may be applied to the tracking element 10, whereby the shift or deviation of the tracking element 10 can be minimized.

The direction of the displacement acceleration of the sledge 12 can be detected in response to the displacement of the sledge 12 as will be described below. In the case of the "rough searching mode", it is, of course, preferable that the displacement velocity of the sledge 12 be almost zero when the beam of light 2 approaches the vicinity of the desired track on the disk-shaped recording medium 7. Therefore, in order to complete "the rough searching" within a shortest time interval with the maximum thrust of the linear motor 13, the sledge 12 is accelerated over the first half of the distance $S_o$ between the track on which the beam of light 2 is located and the desired track and then is decelerated over the remaining half.

Figure 6:
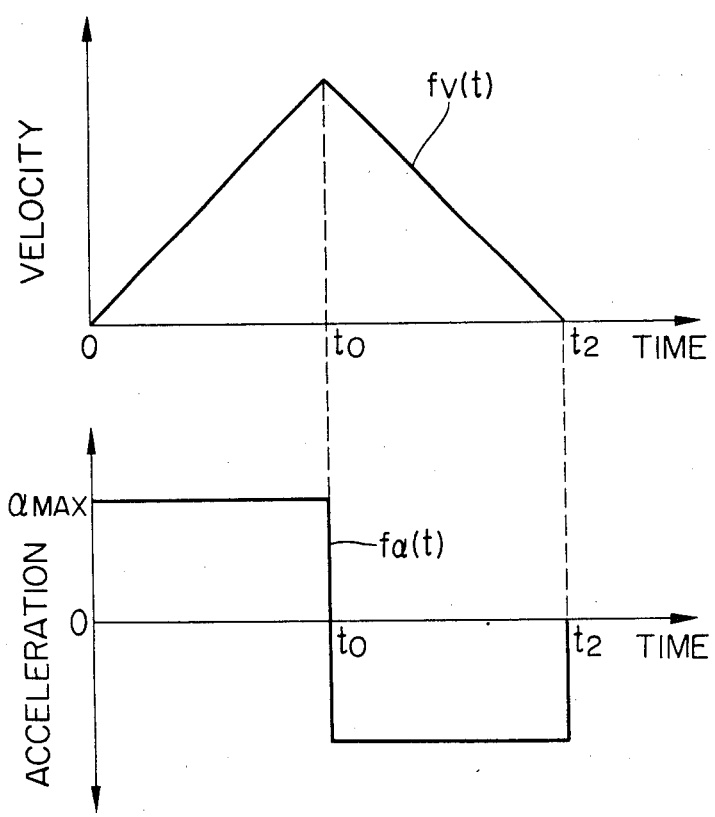
FIG. 6 shows the sledge velocity and acceleration-time diagrams.

In FIG. 6 are shown the velocity and acceleration-deceleration diagrams when the sledge 12 is displaced in the most efficient manner, the velocity curve being indicated by fv(t) while the acceleration-deceleration curve by $f_\alpha(t)$. The maximum acceleration $\alpha_{max}$ of the sledge 12 is given by $$\alpha_{max} = F_{max}/M$$

where $F_{max}$ is the maximum thrust of the linear motor; and M is the mass of the sledge 12. The velocity becomes $fv(t) = \alpha_{max} \cdot t$ and the displacement is given by $S(t) = \frac{1}{2}\alpha_{max} \cdot t^2$. Therefore, the time $t_o$ required for the sledge 12 to travel the distance $S_o/2$ is $t_o = \sqrt{S_o/\alpha_{max}}$. In like manner, the time $t_1$ required for the sledge 12, which is now decelerating at a uniform rate, to travel the remaining $S_o/2$ is obtained. That is, $t_1 = t_o$. Hence, the time required for the sledge to travel the distance $S_o$ becomes $t_2 2 = \sqrt{S_o/\alpha_{max}}$.

As described above, for the most efficient displacement $S_o$ of the sledge 12, it must be accelerated at $\alpha_{max}$ and then decelerated at $-\alpha_{max}$. Acceleration is switched to deceleration at the midpoint of the distance $S_o$.

Therefore, the signal representative of the acceleration $\alpha_{max}$ is applied to the tracking element 10 from the time when the beam of light 2 is shifted to the time when the beam of light 2 reaches the midpoint of the distance $S_o$ and then the signal representative of the deceleration $-\alpha_{max}$ is applied to the tracking element 10 from the time when the beam of light 2 has passed the midpoint to the time when the beam of light reaches the desired track. Then the shift or deviation of the tracking element 10 can be avoided. Depending upon the direction in which the sledge 12 is displaced, the polarity of the acceleration signal is reversed. That is, depending upon whether the sledge 12 traverses the disk-shaped recording medium 7 radially inwardly or outwardly, the polarity of the signal applied to the tracking element 10 is reversed.

Figure 7B:
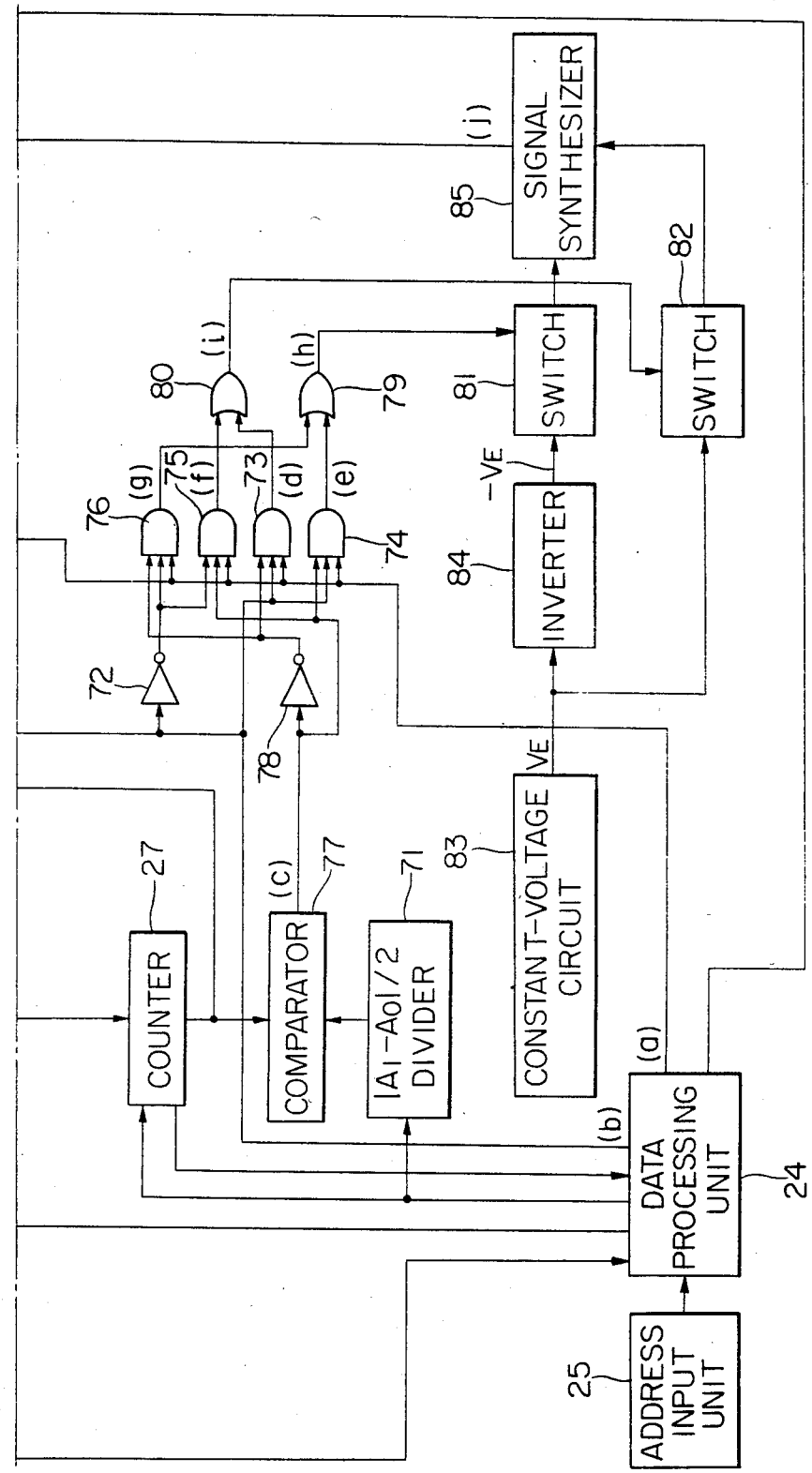
Figure 8:
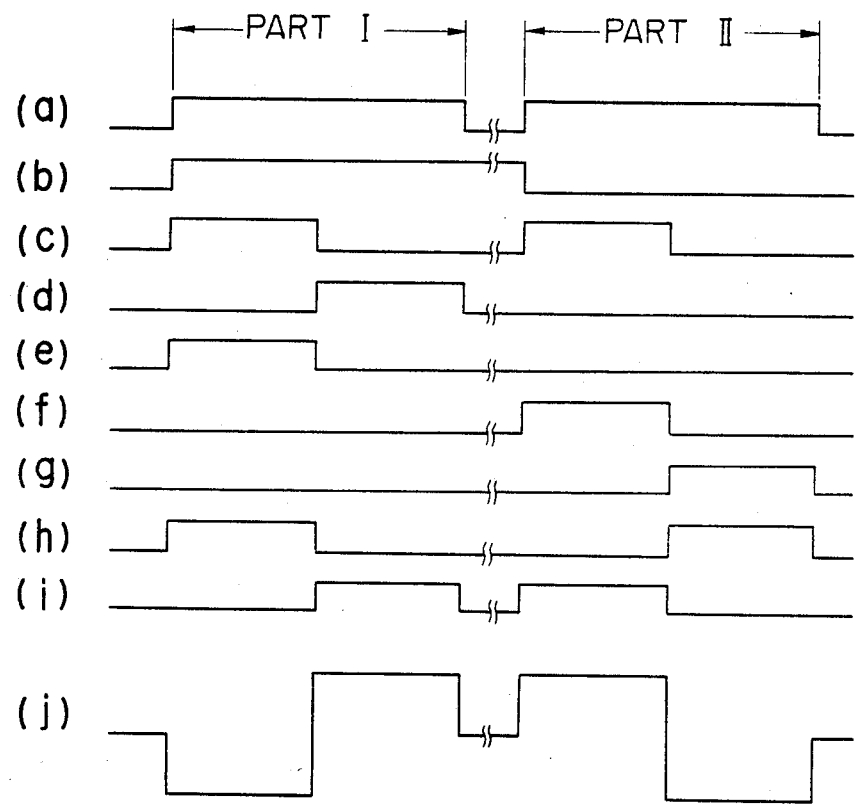
FIG. 8 consisting of parts (a)–(j) is a timing chart used to explain the mode of the operation of the second embodiment.

Second Embodiment, FIGS. 7 and 8

In FIG. 7 is shown in block diagram a second embodiment of the present invention in which the displacement acceleration of the sledge 12 is detected in response to its displacement and a signal corresponding to the direction of the detected acceleration is applied to the tracking element 10, whereby the shift or deviation of the element 10 can be prevented. The component parts which have been already explained in conjunction with the first embodiment will not be described.

In the rough searching mode, the data processing unit 24 applies to the counter 27 and a $|A_1-A_o|/2$ divider 71 the signal representative of $|A_1-A_o|$ where $A_1$ is the address of the track on the disk-shaped recording medium 7 on which the beam of light 2 is presently located and $A_o$ is the address of a desired track to be addressed. The data processing unit 24 also applies the displacement-direction signal to the signal generator 28, an inverter 72 for inverting the polarity of the signal and three-input AND gates 73 and 74. Each of the three-input AND gates 73 and 74 is adapted to deliver a high output signal when all of the three input signals are at a high level. In addition, the data processing unit 24 applies a high-level command signal for driving the linear motor 13 to the switch 23 and three-input AND gates 73, 74, 75 and 76.

The output signal of the divider 71 represents $|A_1-A_o|/2$; that is, one half of the distance that the beam of light 2 must traverse to reach a desired track $A_o$. For instance, assume that $|A_1-A_o|$ is 100100 in binary number. Then the output signal or $|A_1-A_o|/2$ becomes 10010. This means that the value of $|A_1-A_o|$ is shift down by one bit.

A comparator 77 compares the output signal N (where N is a positive integer) with the output signal from the divider 71 and generates a high level signal when $N > |A_1-A_o|/2$, but a low-level signal when $N \leq |A_1-A_o|/2$. The output signal from the comparator 77 is applied to an inverter 78 and the AND gates 74 and 75, the output signal from the inverter 78 is applied to the AND gates 73 and 76 and the output signal from the inverter 72 is applied to the AND gates 75 and 76. The output signals from the AND gates 74 and 76 are applied to a two-input OR gate 79 which delivers a low-level signal when the two input signals are at a low level. The output signals from the AND gates 73 and 75 are delivered to an OR gate 80. The output signal from the OR gate 79 is delivered to the input terminal of a switch 81 for actuating the same. The output signal from the OR gate 80 is applied to the input terminal of a switch 82 for actuating the same.

A constant-voltage circuit 83 generates a constant voltage; that is, an output voltage in proportion to the displacement acceleration of the sledge 12. The output signal from the constant-voltage circuit 83 is applied to an inverter 84 and the switch 82. The inverter 84 inverts the polarity of the output voltage $V_E$ from the constant-voltage circuit 83 and, therefore, produces $-V_E$ which in turn is applied to the switch 81. The output signals from the switches 81 and 82 are applied to a signal synthesizer 85 which combines the two input signals and the output signal from the signal synthesizer 85 is applied to the first signal synthesizer 17.

Now assume that the data processing unit 24 deliver a high-level displacement-direction signal. Then the output signal from the inverter 72 is at a low level and the output signals from the AND gates 75 and 76 are also at a low level. Immediately after the sledge 12 has started, $N > |A_1-A_o|/2$ so that the output signal from the comparator 77 is at a high level. As a result, simultaneous with the driving of the linear motor 13, the output signal from the AND gate 74 rises to a high level so that the switch 81 is closed and consequently the output signal from the constant-voltage circuit 83 is transmitted through the inverter 84, the switch 81, the signal synthesizer 85, the first signal synthesizer 17 and the drive circuit 18 to the tracking element 10. As described previously, the track-traversing detecting circuit 29 generates one pulse signal whenever the beam of light 2 traverses one track on the disk-shaped recording medium 7. The counter 27, which is a down counter, counts down $|A_1-A_o|$ by one everytime when the counter 27 receives one pulse signal from the detection circuit or detector 29. When the output signal N of the counter 27 becomes $|A_1-A_o|/2$, the output signal from the comparator 77 drops to a low level so that the output signal from the inverter 78 rises to a high level. The output signal from the AND gate 74 drops to a low level while the output signal from the AND gate 73 rises to a high level. As a consequence, the output signal from the OR gate 79 drops to a low level while the output signal from the OR gate 80 rises to a high level. As a result, the switch 81 is opened while the switch 82 is closed. The output signal from the constant-voltage circuit 83, therefore, is transmitted through the closed switch 82, the signal synthesizer 85, the first signal synthesizer 17 and the first drive circuit 18 to the tracking element 10. When the output signal from the counter 27 becomes zero, the data processing unit 24 transmits a low-level signal to the switch 23 and the AND gates 73, 74, 75 and 76 so that the linear motor 13 is stopped and the output signal from the constant-voltage circuit 73 is applied to the tracking element 10.

When the displacement-direction signal is at a low level, the output signals from the AND gates 73 and 74 are at a low level while the output signal from the inverter 72 rises to a high level. As a result, simultaneous with the driving of the linear motor 13, the output signal from the AND gate 75 rises to a high level so that the switch 82 is closed. As a result, the output signal of the constant-voltage circuit 73 is transmitted through the closed switch 82, the signal synthesizers 85 and 17 and the drive circuit 18 to the tracking element 10. When the output signal N from the counter 27 equals $|A_1-A_o|/2$, the output signal from the comparator 77 drops to a low level. As a result the switch 82 is opened while the switch 81 is closed. The output signal from the constant-voltage circuit is, therefore, transmitted through the inverter 84, the closed switch 81, the signal synthesizers 85 and 17 and the first drive circuit 18 to the tracking element 10.

The mode of operation of the second embodiment described above with reference to FIG. 7 will be better understood when reference is made to the timing chart as shown in FIG. 8. In FIG. 8, PART I shows the timing chart when the displacement-direction signal is at a high level while PART II shows the timing chart when the displacement-signal is at a low level.

The waveform (a) shows the command signal delivered from the data processing unit 24 to the switch 23 and the AND gates 73, 74, 75 and 76 so as to drive the linear motor 13. The waveform (b) shows the displacement-direction command signal delivered from the data processing unit 24 to the signal generator 28, the inverter 72 and the AND gates 73 and 74. The waveform (c) shows the output signal from the comparator 77; the waveform (d), output signal from the AND gate 73; the waveform (e), the output signal from the AND gate 74; the waveform (f), the output signal from the AND gate 75; the waveform (g), the output signal from the AND gate 76, the waveform (h), the output signal from the OR gate 79; the waveform (i), the output signal from the OR gate 80; and the waveform (j), the output signal from the signal synthesizer 85.

According to the prior art system, if the tracking element 10 is shifted or deviated greatly, the differential amplifier 14 cannot produce a normal output signal so that the track-traversing signal cannot be correctly detected. However, according to the present invention, the shift or deviation of the tracking element 10 can be substantially avoided so that the correct positioning of the beam of light on the proper track can be effected. In addition, since the tracking element 10 can be prevented from being shifted or deviated, the tracking control as well as the sledge displacement control can be positively drawn in an extremely stable manner. As a result, high and stable searching or retrieving becomes possible. Furthermore, the system can be made highly reliable and dependable in operation.

When the system is so designed and constructed that in response to the signal produced whenever the beam of light traverses each track, the displacement velocity of the sledge is detected, the sledge can be reduced in mass and the whole system can be made simple in construction and consequently can be manufactured at less costs.

It is to be understood that the present invention is not limited to the above-described embodiments and that the present invention may be equally applied to a magnetic recording and reproducing system, a capacitance type reproducing system, optical-magnetic recording and reproducing systems and so on.

What is claimed is:

1. A tracking system for controlling the radial positioning of a transducer means on a disc information medium, comprising:
   (a) transducer means for writing and/or reading data onto or out of the disc information medium with a track or a multiplicity of tracks along which data are to be written or recorded;
   (b) fine driving means for displacing the scanning position of said transducer means in the radial direction substantially perpendicular to the direction of said track or tracks on said information medium;
   (c) coarse driving means driven by current for displacing said fine driving means in the radial direction substantially perpendicular to the direction of said track or tracks on said information medium;
   (d) first error detection means for generating a position error signal indicative of the displacement of the scanning position of said transducer means from the center of a track on said information medium;
   (e) second error detection means coupled to receive information indicative of a commanded scanning position of said transducer means and an actual scanning position of said transducer means and generate a position error signal indicative of the difference therebetween;
   (f) first control means responsive to the signal from said first error detection means for controlling said fine driving means in such a way that the scanning position of said transducer means can always be positioned above a track on said information medium;
   (g) second control means responsive to the signal from said first error detection means for controlling said coarse driving means in such a way that said fine driving means can be generally positioned at the center of its displacement range;
   (h) switch means for making said first and second control means inoperative;
   (i) third control means responsive to the signal from said second error detection means for controlling said coarse driving means while said first and second control means are made inoperative in such a way that the scanning position of said transducer means can be moved in a direction tending to reduce the difference between the commanded and actual scanning positions of said transducer means;
   (j) acceleration detecting means for detecting and indicating the displacement acceleration of said coarse driving means; and
   (k) fourth control means responsive to the signal from said acceleration detecting means for controlling said fine driving means while said first and second control means are made inoperative in such a way that the force of inertia exerted on said fine driving means due to the displacement of said coarse driving means can be substantially counteracted.

2. The tracking system as set forth in claim 1, further comprising means responsive to the driving current of said coarse driving means while said first and second control means are made inoperative, for detecting the displacement acceleration of said coarse driving means.

3. The tracking system as set forth in claim 1, further comprising means responsive to the signal from said second error detection means while said first and second control means are made inoperative, for detecting the displacement acceleration of said coarse driving means.

4. A tracking system for controlling the radial positioning of a transducer means on a disc information medium, comprising:
   (a) transducer means for writing and/or reading data onto or out of the disc information medium with a track or a multiplicity of tracks along which data are to be written or recorded;
   (b) fine driving means for displacing the scanning position of said transducer means in the radial direction substantially perpendicular to the direction of said track or tracks on said information medium;
   (c) coarse driving means for displacing said fine driving means in the radial direction substantially perpendicular to the direction of said track or tracks on said information medium;
   (d) first error detection means for generating a position error signal indicative of the displacement of the scanning position of said transducer means from the center of a track on said information medium;
   (e) second error detection means coupled to receive information indicative of a commanded scanning position of said transducer means and an actual scanning position of said transducer means and generate a position error signal indicative of the difference therebetween;
(f) first control means responsive to the signal from said first error detection means for controlling said fine driving means in such a way that the scanning position of said transducer means can always be positioned above a track on said information medium;
(g) second control means responsive to the signal from said first error detection means for controlling said coarse driving means in such a way that said fine driving means can be generally positioned at the center of its displacement range;
(h) switch means for making said first and second control means inoperative;
(i) third control means responsive to the signal from said second error detection means for controlling said coarse driving means, while said first and second control means are made inoperative, in such a way that the scanning position of said transducer means can be moved in a direction tending to reduce the difference between commanded and actual scanning positions of said transducer means;
(j) velocity detecting means for detecting and indicating the displacement velocity of said coarse driving means;
(k) acceleration signal generating means coupled to receive the signal from said velocity detecting means and generate a signal substantially corresponding to the displacement acceleration of said coarse driving means; and
(l) fourth control means responsive to the signal from said acceleration signal generating means for controlling said fine driving means, while said first and second control means are made inoperative, in such a way that the force of inertia exerted on said fine driving means due to the displacement of said coarse driving means can be substantially counteracted.

5. The tracking system as set forth in claim 10, wherein a velocity signal corresponding to the displacement velocity of said coarse driving means is applied across a series differentiating circuit comprising a capacitor and a resistor so that the displacement acceleration of said coarse driving means can be detected from a signal developed across said resistor.

6. A tracking system for controlling the radial positioning of a transducer means on a disc information medium, comprising:
(a) transducer means for writing and/or reading data onto or out of the disc information medium with a track or a multiplicity of tracks along which data are to be written or recorded;
(b) fine driving means for displacing the scanning position of said transducer means in the radial direction substantially perpendicular to the direction of said track or tracks on said information medium;
(c) coarse driving means for displacing said fine driving means in the radial direction substantially perpendicular to the direction of said track or tracks on said information medium;
(d) first error detection means for generating a position error signal indicative of the displacement of the scanning position of said transducer means from the center of a track on said information medium;
(e) second error detection means coupled to receive information indicative of a commanded scanning position of said transducer means and an actual scanning position of said transducer means and generate a position error signal indicative of the difference therebetween;
(f) first control means responsive to the signal from said first error detection means for controlling said fine driving means in such a way that the scanning position of said transducer means can always be positioned above a track on said information medium;
(g) second control means responsive to the signal from said first error detection means for controlling said coarse driving means in such a way that said fine driving means can be generally positioned at the center of its displacement range;
(h) switch means for making said first and second control means inoperative;
(i) third control means responsive to the signal from said second error detection means for controlling said coarse driving means, while said first and second control means are made inoperative, in such a way that the scanning position of said transducer means can be moved in a direction tending to reduce the difference between the commanded and actual scanning positions of said transducer means;
(j) track-traversing detecting means coupled to receive the signal from said transducer means and generate an output signal or pulse each time the scanning position of said transducer means crosses one track;
(k) velocity detecting means coupled to receive the output signal from said track-traversing detecting means and generate a velocity signal substantially corresponding to the displacement velocity of said coarse driving means;
(l) acceleration signal generating means coupled to receive the velocity signal from said velocity detecting means and generate a signal substantially corresponding to the displacement acceleration of said second driving means; and
(m) fourth control means responsive to the signal from said acceleration signal generating means for controlling said fine driving means, while said first and second control means are made inoperative, in such a way that the force of inertia exerted on said fine driving means due to the displacement of said coarse driving means can be substantially counteracted.

7. The tracking system as set forth in claim 6, wherein the velocity detecting means includes a frequency-to-voltage converter which converts the frequency of an input signal into a corresponding voltage.

8. The tracking system as set forth in claim 6, wherein the velocity signal is applied across a series differentiating circuit comprising a capacitor and a resistor so that the displacement acceleration of said coarse driving means can be detected from a signal developed across said resistor.

* * * * *